Figure 1:
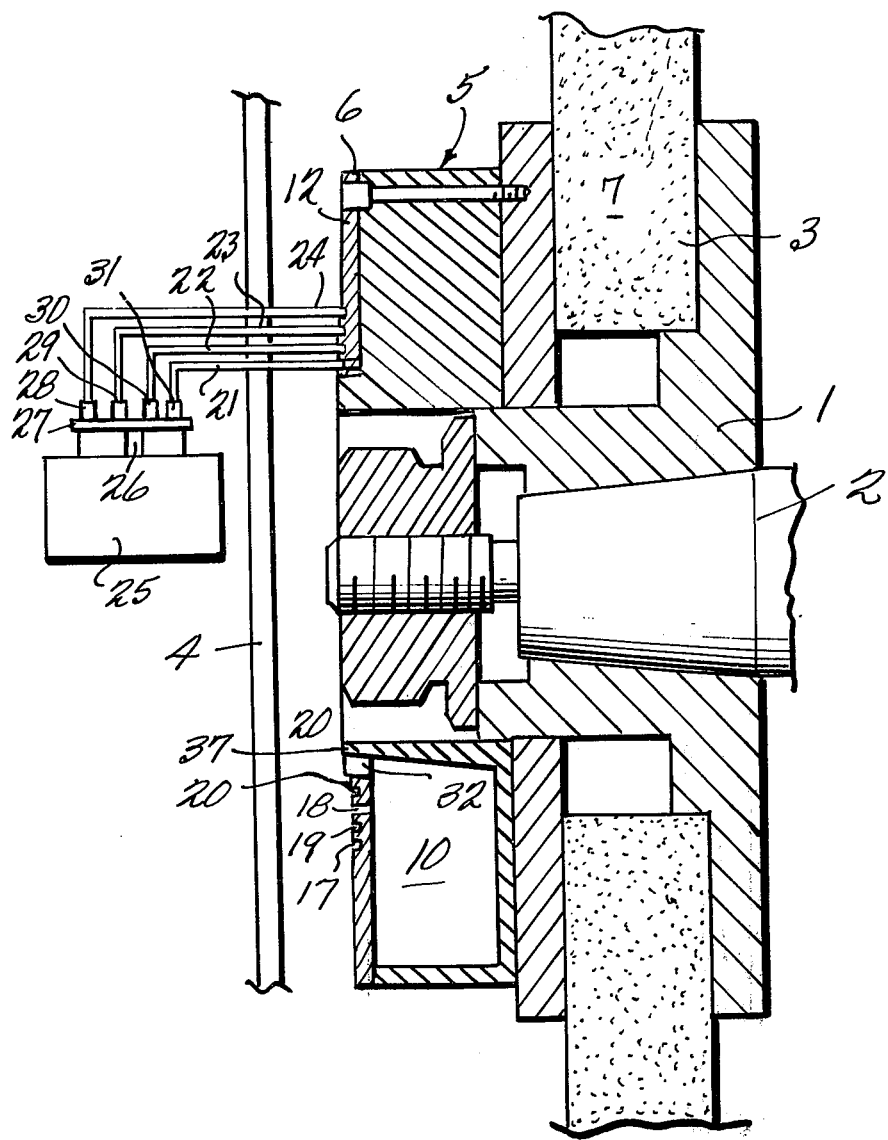

United States Patent [19]

Birkenstock et al.

[11] 3,967,416
[45] July 6, 1976

[54] SYSTEM FOR COMPENSATING THE UNBALANCE OF A ROTATING BODY, ESPECIALLY OF A GRINDING WHEEL

[75] Inventors: Dieter Birkenstock, Bad Konig; Otto Jäger, Ueberau, both of Germany

[73] Assignee: Gebr. Hofmann KG, Darmstadt, Germany

[22] Filed: Aug. 12, 1975

[21] Appl. No.: 603,966

[30] Foreign Application Priority Data
Aug. 22, 1974 Germany.................... 7428410[U]

[52] U.S. Cl. ................................ 51/169; 74/573 F
[51] Int. Cl.[2] ........................................ B25B 41/04
[58] Field of Search ............. 51/169; 74/573 F, 573

[56] References Cited
UNITED STATES PATENTS 3,597,882   8/1971   Riddington ........................ 74/573
3,812,724   5/1974   Curtz et al. ........................ 74/573

FOREIGN PATENTS OR APPLICATIONS
711,531   7/1954   United Kingdom ................. 74/573

*Primary Examiner*—James L. Jones, Jr.
*Attorney, Agent, or Firm*—Cushman, Darby and Cushman

[57] ABSTRACT

A balancing apparatus, particularly for a grinding wheel, whereby the wheel has four individual chambers disposed around its axis of rotation with each chamber connected to one face of the ring shaped container by a slot formed in a circular recess at a different radius so that the wheel can be balancing by injecting cooling fluid or the like into the slots to temporarily add fluid to selected chambers, and each chamber is separated from adjoining chambers by dividing walls which extend from inner to outer ring. The inner ring is tapered toward a central opening to ensure complete emptying after balancing.

9 Claims, 2 Drawing Figures

SYSTEM FOR COMPENSATING THE UNBALANCE OF A ROTATING BODY, ESPECIALLY OF A GRINDING WHEEL

The invention relates to a system for compensating the unbalance of a rotating body, especially of a grinding wheel with several chambers arranged around the axis of rotation and rotating together with the body, into which a balancing fluid can be injected dependent of an arising unbalance, controlled by a control system.

U.S. application Ser. No. 523,121 filed Nov. 12, 1974 describes one such system. The disclosure of this copending application is hereby incorporated by reference into this present application.

With this device several, preferably four chambers are accommodated in a ring-shaped container on the front side of which fluid inlets are provided which are arranged on different radii, whereby each inlet of a certain radius is assigned to a certain chamber. One fluid conduit is assigned to each radius and thus to each chamber.

The disadvantage of this device lay in the unfavorable design of the dividing walls of the individual chambers. As these walls did not extend from the outer ring to the inner ring of the ring-shaped container, difficulties arose when the balancing fluid which should flow out during the slow-down of the rotating bodies, flows from one chamber into the other through the dividing walls.

It is advantageous that the individual chambers be completely empty at the start of each new balancing operation so that no additional unbalances are superimposed on the body to be balanced and no compensation capacity is taken away from the balancing system. For enabling the balancing fluid to flow out of the ring-shaped container, circular openings are arranged on the front side of the ring-shaped container on the inner ring. Therefore, the balancing fluid should be able to flow out of the chambers through these openings after the body has stopped rotating. With the device described above, however, part of the fluid flows from one chamber into another so that the chambers are not emptied completely.

It is an object of the invention to avoid the above-mentioned disadvantage by enabling complete voiding of the chambers during slow-down of the rotating body. This is achieved according to the present invention in that the dividing walls of the individual chambers of the ring-shaped container extend from the outer ring to the inner ring, and in that the inner ring is tapered on the side of the chambers. Owing to the continuous dividing walls of the individual chambers the balancing fluid cannot flow from one chamber to the other during slow-down of the rotating body, but is led to the outside through the circular opening of the face of the ring-shaped container. The tapered inner ring the inclination of which is directed toward the opening, still facilitates this flow. This arrangement ensures that the balancing device is completely empty after the machine has stopped so that there are no fluid remains when a new balancing procedure is started.

Figure 2:
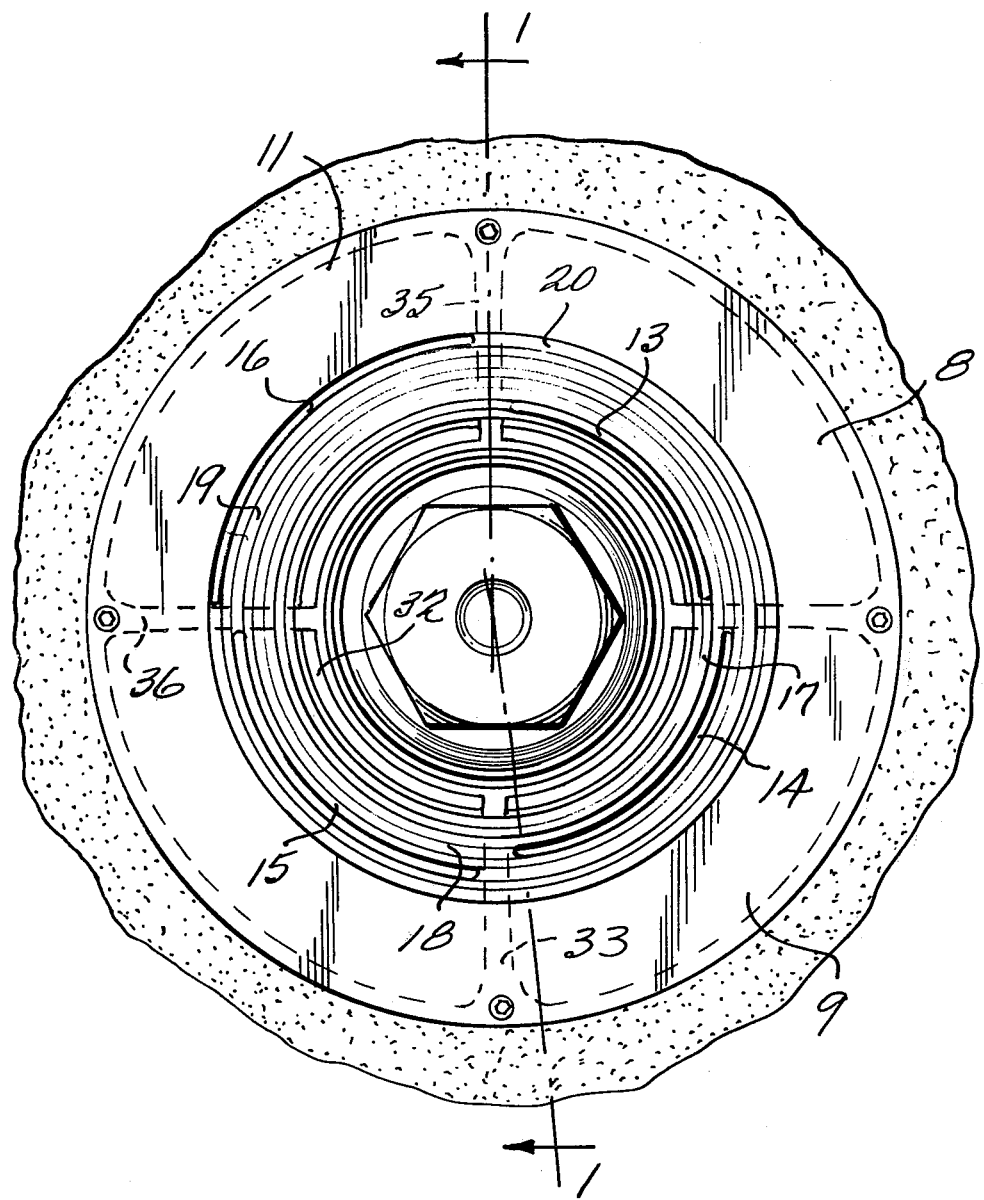

The invention is now explained more in detail on the basis of a preferred embodiment with reference to the following figures in which:

FIG. 1 shows a schematic lateral view of the system.
FIG. 2 shows a schematic view of the ring-shaped container.

As described in the above mentioned application a machine with a rotating body, in this example a grinding unit 1 with a grinding wheel 3 fitted on a spindle 2, is provided with a protection cover 4. A ring-shaped container 5 is attached to a foundation 7 of grinding wheel 3, concentrically to the rotor axle, by means of screws. The ring-shaped container 5 is provided with four chambers 8–11 divided by continuous walls 33–36, the container consisting of plates welded together or made of one piece. Container 5 is provided with a cover 12. The inner ring 37 of the ring-shaped container 5 is tapered whereby the inclination is directed toward the opening 32.

Cover 12 of the ring-shaped container 5 which may be fitted by means of screws, is provided with four slots 13–16 serving as fluid inlets, whereby one slot 13–16 is assigned to each chamber 8–11. Slots 13–16 are arranged on different radii whereby preference is given to the inner range in order to achieve a large capacity for the compensating device. To each slot a concentric circular groove 17–20 is assigned in order to achieve an improved guidance of the fluid and a better whirling-off behavior. Also, nozzles 21–24 can thus be approached as far as possible to slots 13–16. Nozzles 21–24 are firmly attached to the protection cover 4 of the grinding machine and arranged one above the other. Each nozzle is assigned to one slot and thus to one chamber. From a reservoir 25 balancing fluid flows through a conduit 26 to a valve block 27 provided with valves 28–31. Valves 28–31 are connected with nozzles 21–24 through conduits.

For each compensation procedure the following steps must be carried out. The procedure is explained with a system featuring four chambers.

With an unbalance indicated by the measuring electronics valve 28 is, e.g., actuated in such a way that the balancing fluid flows during the rotation from container 25 through nozzle 24 and slot 16 into chamber 11. Cooling agents which are used for the operation of grinding machines or turning lathes can be utilized as balancing means so that the fluid splashing past the slots does not present any problem. If the unbalance indicated by the measuring electronics increases, valve 28 is blocked and valve 30 is opened. Thus the balancing fluid is spouted into the opposite chamber 9 until a minimum value is indicated. Then valve 29 is actuated and unbalance fluid spouted into chamber 10. If the indication increases valve 29 is blocked and valve 31 is actuated, i.e. balancing fluid is spouted into the opposite chamber 8 until a minimum indication is obtained. In the end valves 30 and 31 are actuated alternately until the unbalance indication of the electronics is "0" or lies within the tolerance range.

The compensation procedure can, of course, also be carried out with component indication or fully automatically.

After the disconnection of the machine and during the slow-down the water of the individual chambers 8–11 each flows through a separate circular opening 32, whereby it cannot flow into the next chamber. Furthermore the inner ring 37 is tapered so that the fluid cannot accumulate in the rear part of container 5 so that after the standstill of the machine the balancing system is completely empty and available for a new balancing procedure when the machine is started again.

What is claimed is:

1. In an apparatus for compensating for the unbalance of a rotating body including a machine tool with several chambers arranged around the axis of rotation, which rotate together with the rotor and into which, controlled by a control unit, a balancing fluid may be injected, the chambers being disposed in a ring-shaped container at one side of which fluid inlets are provided, arranged on different radii, whereby each inlet on a certain radius is assigned to a certain chamber and one fluid feed pipe is provided for each radius, the improvement wherein solid dividing walls extend between adjoining chambers at least between said inlets.

2. In an apparatus according to claim 1, wherein the fluid inlets are slots and the fluid feed pipes are nozzles so that the balancing fluid can be injected directly into the chambers.

3. In an apparatus according to claim 1, wherein the ring-shaped container is mounted directly on the rotor.

4. In an apparatus according to claim 1, wherein on the front side of the ring-shaped container additional circular recesses are provided, the radii of which correspond to the radii on which the fluid inlets are arranged.

5. In an apparatus according to claim 1 wherein four chambers are provided in said ring-shaped container.

6. In an apparatus according to claim 1, wherein the balancing fluid is a cooling fluid and including said fluid.

7. In an apparatus according to claim 1, wherein the inlets on the radii are located near the inside diameter of the ring-shaped container.

8. In an apparatus as in claim 1, wherein said machine tool is a grinding wheel.

9. In an apparatus as in claim 1 wherein the inner ring of said container has an opening to said chambers and is tapered toward said opening.

* * * * *